(12) United States Patent
Saito (10) Patent No.: US 11,761,505 B2
(45) Date of Patent: Sep. 19, 2023

(54) DAMPER DEVICE (71) Applicant: PIOLAX, INC., Kanagawa (JP)

(72) Inventor: Jun Saito, Kanagawa (JP)

(73) Assignee: PIOLAX, INC., Kanagawa (JP)

(*) Notice: Subject to any disclaimer, the term of this patent is extended or adjusted under 35 U.S.C. 154(b) by 57 days.

(21) Appl. No.: 17/503,820

(22) Filed: Oct. 18, 2021

(65) Prior Publication Data
US 2022/0128113 A1 Apr. 28, 2022

(30) Foreign Application Priority Data

Oct. 23, 2020 (JP) ................................ 2020-178188

(51) Int. Cl.
| | | |
|---|---|---|
| *F16F 9/02* | (2006.01) | |
| *F16F 9/49* | (2006.01) | |
| *F16F 9/36* | (2006.01) | |
| *F16F 9/32* | (2006.01) | |

(52) U.S. Cl.
CPC .......... *F16F 9/0227* (2013.01); *F16F 9/3214* (2013.01); *F16F 9/3242* (2013.01); *F16F 9/368* (2013.01); *F16F 9/49* (2013.01)

(58) Field of Classification Search
CPC ........ F16F 9/368; F16F 9/0227; F16F 9/3214; F16F 9/3242; F16F 9/49; E05Y 2900/538
See application file for complete search history.

(56) References Cited

U.S. PATENT DOCUMENTS

| | | | | |
|---|---|---|---|---|
| 4,673,000 A | * | 6/1987 | Haerr ................... | F16K 15/142 417/511 |
| 6,062,352 A | | 5/2000 | Shinozaki et al. | |
| 8,453,810 B2 | * | 6/2013 | Okabayashi ........... | F16F 9/368 188/316 |
| 10,221,909 B2 | * | 3/2019 | Saito .................... | F16F 9/0218 |
| 10,233,994 B2 | * | 3/2019 | Inoue ................... | F16F 9/0227 |
| 10,626,946 B2 | * | 4/2020 | Shimozaki .............. | F16J 15/18 |

FOREIGN PATENT DOCUMENTS

| | | | |
|---|---|---|---|
| JP | 2000-065116 A | | 3/2000 |
| JP | 2015230017 A | * | 12/2015 |

* cited by examiner

*Primary Examiner* — Xuan Lan Nguyen
(74) *Attorney, Agent, or Firm* — Paratus Law Group, PLLC (57) ABSTRACT

There is provided a damper device including: a cylinder; a piston; and a seal ring. The piston includes: a column portion wound around the seal ring; and a first restricting portion and a second restricting portion that are configured to restrict movement of the seal ring in a axial direction. The column portion has a protruding portion protruding outward in a radial direction. The first restricting portion has a cutout portion. The seal ring is capable of taking a deformed state where the seal ring is deformed so as to partially enter the cutout portion by movement of the piston. In a case where the seal ring is in the deformed state, and in a normal state where the seal ring does not enter the cutout portion, the seal ring is pressed against an inner peripheral surface of the cylinder by the protruding portion.

6 Claims, 8 Drawing Sheets

DAMPER DEVICE

CROSS-REFERENCE TO RELATED APPLICATIONS

This application is based on Japanese Patent Application No. 2020-178188 filed on Oct. 23, 2020, the contents of which are incorporated herein by way of reference.

TECHNICAL FIELD

The present invention relates to a damper device including a piston capable of moving forward and backward in a cylinder, and a seal ring provided on an outer periphery of the piston.

BACKGROUND

Patent Literature 1 discloses an air damper including a cylindrical cylinder, a piston that moves in the cylinder, and a cap provided at one end of the cylinder. The piston includes an annular seal protrusion that replaces an O-ring. The cap forms an orifice that connects a cylinder chamber to the outside.
Patent Literature 1: JP-A-2000-65116

In the technique disclosed in Patent Literature 1, when the piston rapidly moves, the movement of air in the cylinder chamber does not appropriately occur from the orifice, and the piston may be returned in an opposite direction due to a pressure in the cylinder chamber.

An object of the present invention is to provide a damper device in which, when a piston rapidly moves, it is difficult for the piston to return in a direction opposite to a direction in which the piston moves due to a pressure in a cylinder chamber.

SUMMARY

In order to solve the above described problem, there is provided a damper device including: a cylinder having a bottom portion and an opening portion; a piston capable of moving forward and backward in the cylinder in an axial direction; and a seal ring provided on an outer periphery of the piston and configured to abut on an inner periphery of the cylinder. The piston includes: a column portion wound around the seal ring; and a first restricting portion and a second restricting portion that are positioned on both end sides of the column portion in the axial direction, that are formed so as to protrude outward in a radial direction from an outer peripheral surface of the column portion, and that are configured to restrict movement of the seal ring in the axial direction. The column portion has a protruding portion protruding outward in the radial direction on the outer peripheral surface. The first restricting portion has a cutout portion that is formed so as to cut out a surface facing the second restricting portion and that is positioned to be continuous with the protruding portion in the axial direction. The seal ring is provided so as to be sealable with respect to the second restricting portion, and is capable of taking a deformed state where the seal ring is deformed so as to partially enter the cutout portion by movement of the piston. In a case where the seal ring is in the deformed state, and in a normal state where the seal ring does not enter the cutout portion, the seal ring is pressed against an inner peripheral surface of the cylinder by the protruding portion.

DESCRIPTION OF EMBODIMENTS

Figure 1:
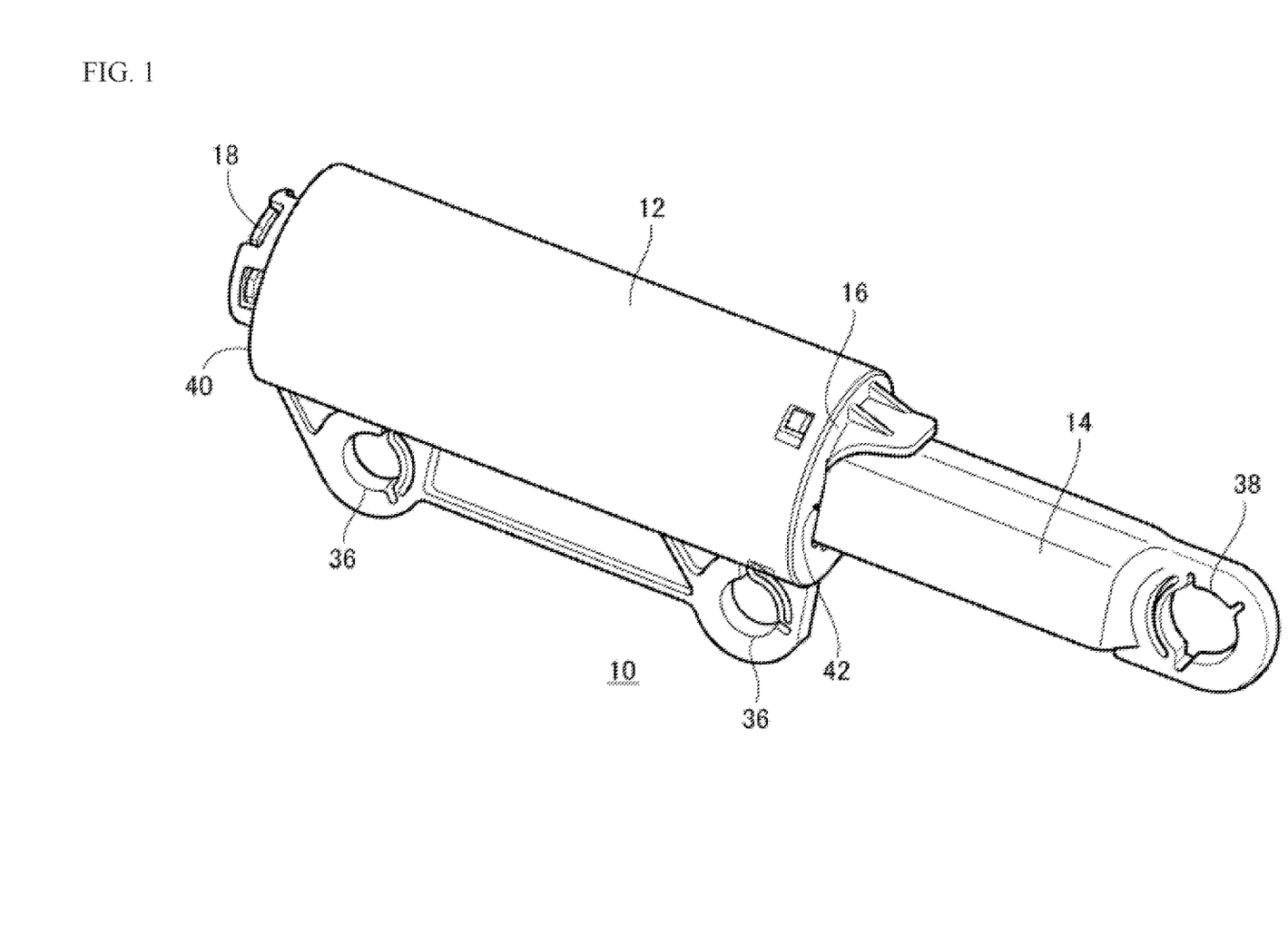
FIG. 1 is a perspective view of a damper device according to an embodiment.

FIG. 1 is a perspective view of a damper device 10 according to an embodiment.

Figure 2:
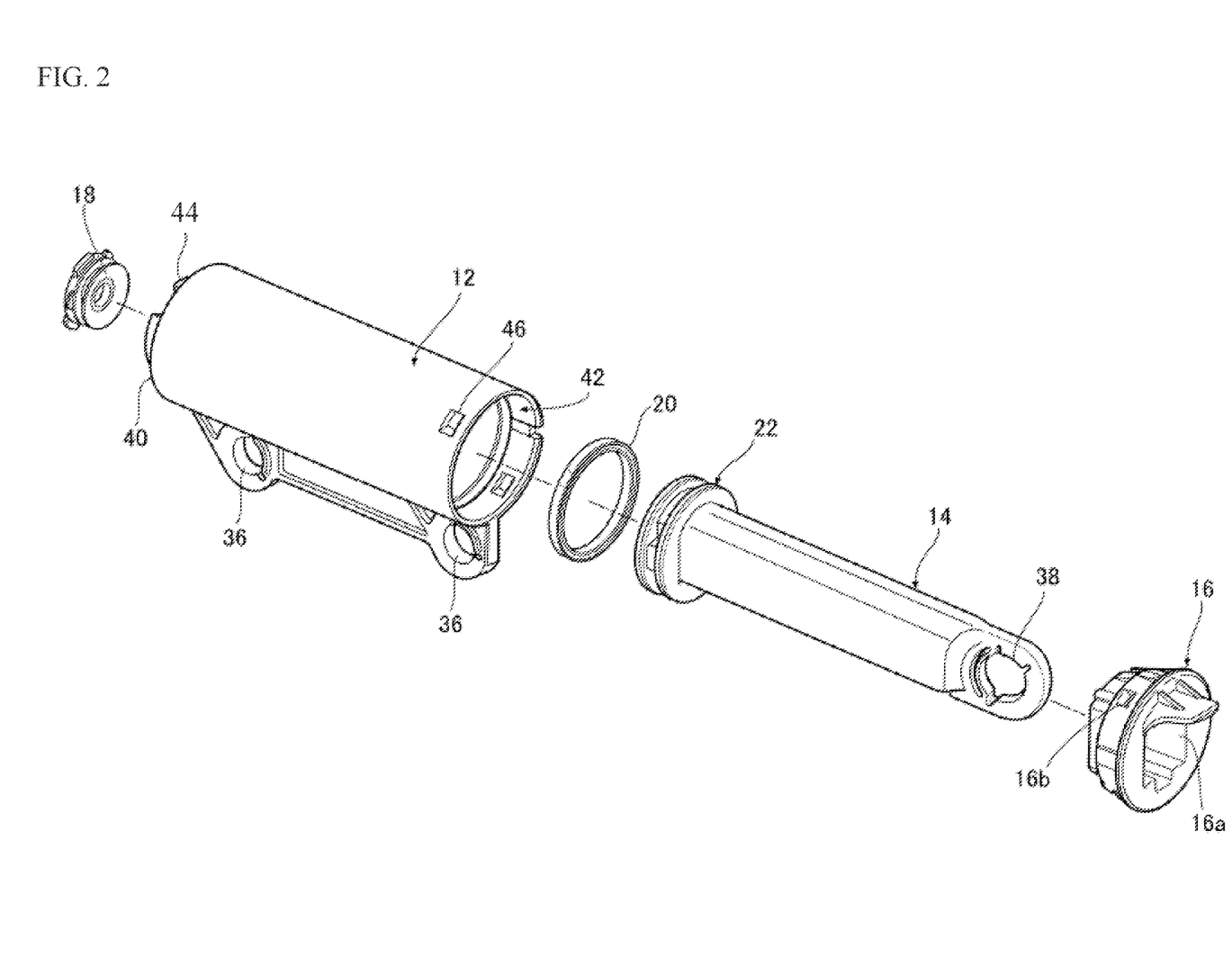
FIG. 2 is an exploded view of the damper device according to the embodiment.

Further, FIG. 2 is an exploded view of the damper device 10 according to the embodiment. The damper device 10 is attached to, for example, a glove box of a vehicle, and applies a damping force to an opening and closing operation of an opening and closing body (lid member) of the glove box. Further, the damper device 10 may be attached to a console box of the vehicle, and may apply a damping force to opening and closing of an opening and closing body of the console box. The glove box or the console box functions as a fixed body, and the damper device 10 is connected to the fixed body and the opening and closing body that opens and closes an opening of the fixed body.

The damper device 10 includes a cylinder 12, a transmission portion 14, a guide portion 16, a cap 18, a seal ring 20, and a piston 22. The damper device 10 generates viscous resistance by using air as a viscous fluid.

The cylinder 12 includes a first shaft support portion 36, a bottom portion 40, an opening portion 42, a holding portion 44, and a locking hole 46. The cylinder 12 is formed in a cylindrical shape, and includes the bottom portion 40 at one end and the opening portion 42 at the other end. The first shaft support portion 36 protrudes outward in a radial direction from an outer peripheral surface of the cylinder 12, has a through hole into which one of the fixed body and the opening and closing body is inserted, and is pivotally supported by one of the fixed body and the opening and closing body.

The holding portion 44 is formed on the bottom portion 40 and holds the cap 18. The locking hole 46 is formed in an inner peripheral surface of the cylinder 12 and locks the guide portion 16.

The transmission portion 14 is formed in a rod shape, and is inserted from the opening portion 42 of the cylinder 12. The transmission portion 14 transmits an external force to the piston. The transmission portion 14 includes a second shaft support portion 38 that is pivotally supported by the other of the fixed body and the opening and closing body. The second shaft support portion 38 has a through hole into which the other of the fixed body and the opening and closing body is inserted. The through holes of the first shaft support portion 36 and the second shaft support portion 38 are parallel to each other.

The guide portion 16 is attached to the opening portion 42 of the cylinder 12, and guides the forward movement and the backward movement of the transmission portion 14. The guide portion 16 has a guide hole 16a through which the transmission portion 14 is inserted, and a locking claw 16b which is locked to the locking hole 46 of the cylinder 12.

The cap 18 is attached to the bottom portion 40 by the holding portion 44, has a minute hole serving as an orifice, and forms the orifice on the bottom portion 40 side of the cylinder 12.

The seal ring 20 is provided on an outer periphery of the piston 22, divides the inside of the cylinder 12 into a first chamber and a second chamber, and abuts on an inner periphery of the cylinder 12. The seal ring 20 is formed of a rubber material and is deformable.

The piston 22 is provided at one end of the transmission portion 14, is disposed in the cylinder 12, and is movable forward and backward in the cylinder 12 in an axial direction.

The piston 22 is provided integrally with the transmission portion 14.

Figure 3A:
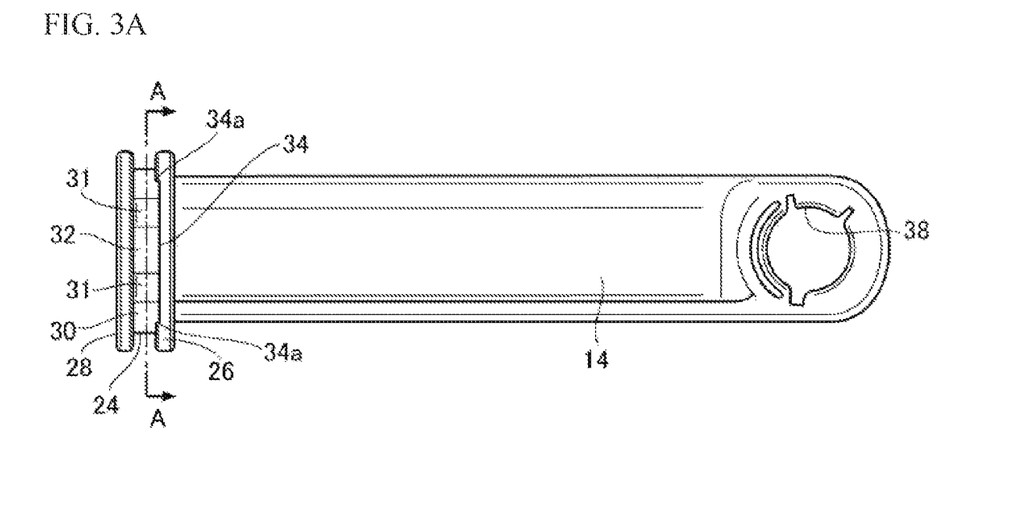
FIG. 3A is a side view of a transmission portion and a piston.
Figure 3B:
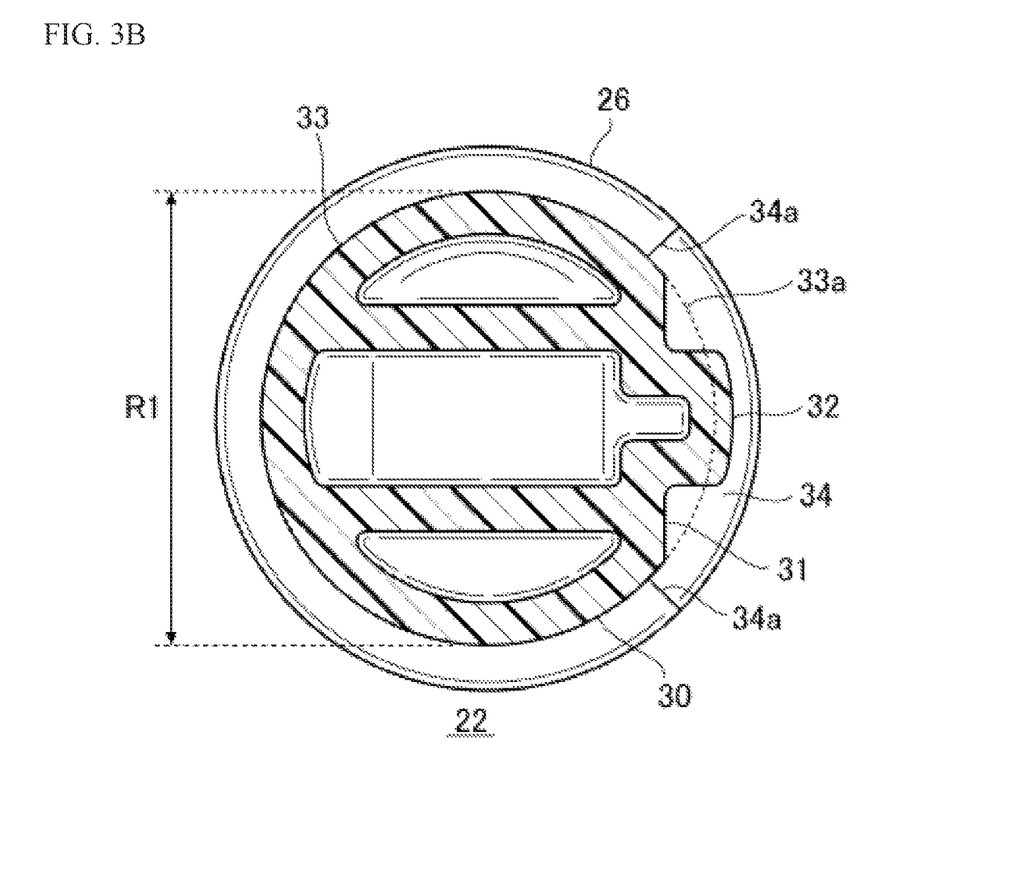
FIG. 3B is a cross-sectional view of the piston taken along a line A-A shown in FIG. 3A.

FIG. 3A is a side view of the transmission portion 14 and the piston 22, and FIG. 3B is a cross-sectional view of the piston 22 taken along a line A-A shown in FIG. 3A. The piston 22 includes a column portion 24, a first restricting portion 26, and a second restricting portion 28.

The first restricting portion 26 and the second restricting portion 28 are positioned at both ends of the column portion 24 in the axial direction, and are formed so as to protrude outward in the radial direction from an outer peripheral surface 30 of the column portion 24. The first restricting portion 26 and the second restricting portion 28 restrict the movement of the seal ring 20 wound around the column portion 24 in the axial direction when the piston 22 moves forward and backward.

The first restricting portion 26 includes a cutout portion 34 formed to be recessed in the axial direction. As shown in FIG. 3A, the cutout portion 34 is formed on a surface facing the second restricting portion 28. Both end portions 34a of the cutout portion 34 are formed in a stepped shape and have a predetermined angular width, for example, an angular width of 120 degrees. By forming the cutout portion 34, the seal ring 20 can be deformed so as to partially enter the cutout portion 34. The surface of the second restricting portion 28 facing the first restricting portion 26 is uniform, and no cutout is formed.

The column portion 24 is positioned between the first restricting portion 26 and the second restricting portion 28. The column portion 24 is formed in a columnar shape, and includes a recessed portion 31, a protruding portion 32, and an arc portion 33 on the outer peripheral surface 30. The protruding portion 32 is formed on the outer peripheral surface 30 so as to protrude outward in the radial direction, and the recessed portion 31 is formed so as to be recessed on both sides of the protruding portion 32 in a peripheral direction. The arc portion 33 occupies a half or more of the outer peripheral surface 30 of the column portion 24, and is formed smoothly.

As shown in FIG. 3B, the protruding portion 32 protrudes outward in the radial direction from a circumscribed circle 33a of the arc portion 33. Accordingly, the seal ring 20 wound around the column portion 24 abuts on the protruding portion 32.

The protruding portion 32 is formed from the second restricting portion 28 to the cutout portion 34 of the first restricting portion 26. The cutout portion 34 is formed so as to cut out the facing surface of the first restricting portion 26 facing the second restricting portion 28, and is positioned so as to be continuous with the protruding portion 32 in the axial direction. In a position in the peripheral direction, the protruding portion 32 is positioned between both end portions 34a of the cutout portion 34. Accordingly, the seal ring 20 can be deformed so as to enter the cutout portion 34 side while maintaining a state where the seal ring 20 abuts on the protruding portion 32.

The protruding portion 32 protrudes along the axial direction of the first shaft support portion 36 and the second shaft support portion 38. Accordingly, the protruding portion 32 can be disposed at a position that is not easily affected by an external force input from the first shaft support portion 36 and the second shaft support portion 38, and when the piston 22 is eccentric due to the external force, separation of the protruding portion 32 from the inner peripheral surface of the cylinder 12 is suppressed.

Figure 4A:
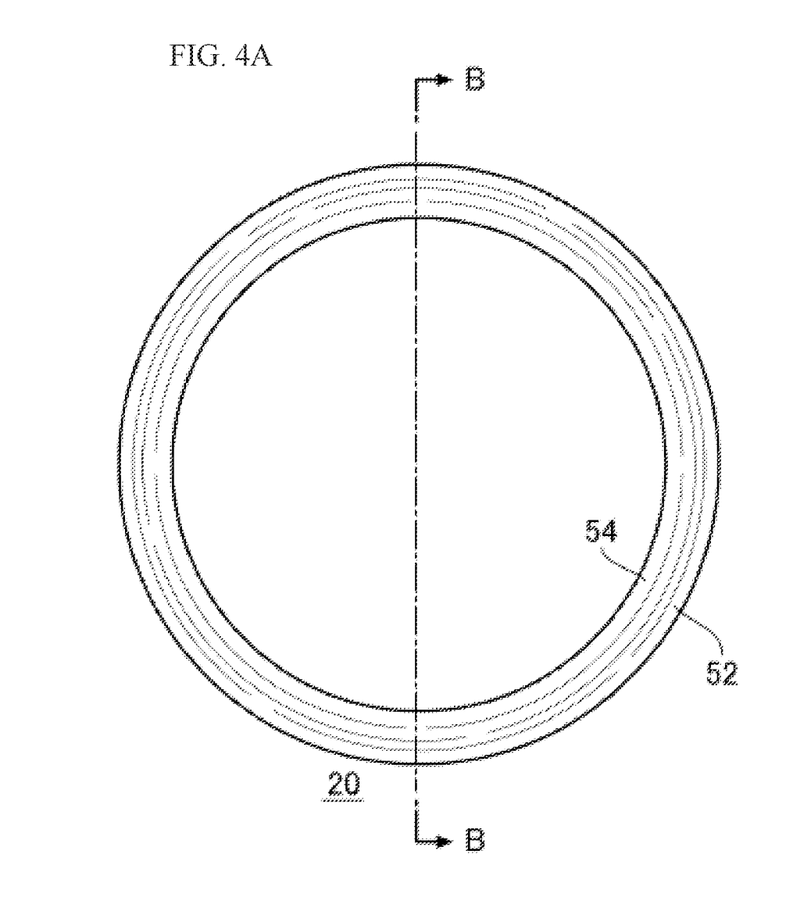
FIG. 4A is a front view of a seal ring.
Figure 4B:
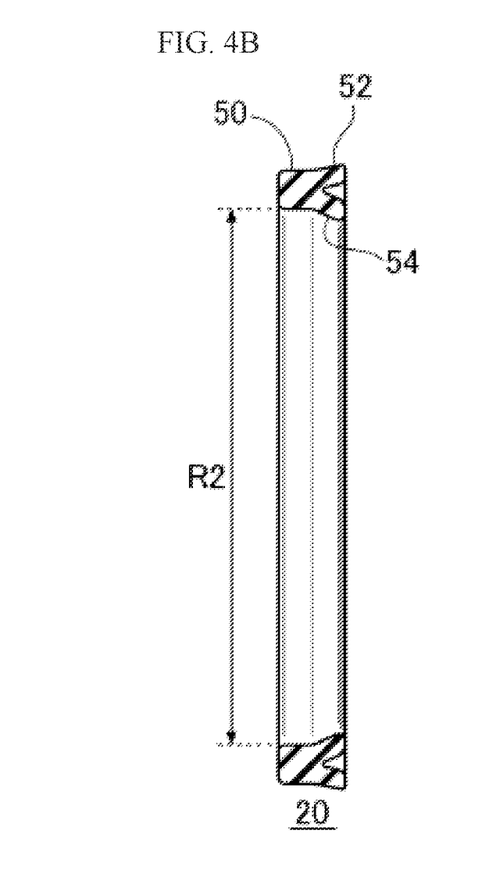
FIG. 4B is a cross-sectional view of the seal ring taken along a line B-B shown in FIG. 4A.
Figure 4C:
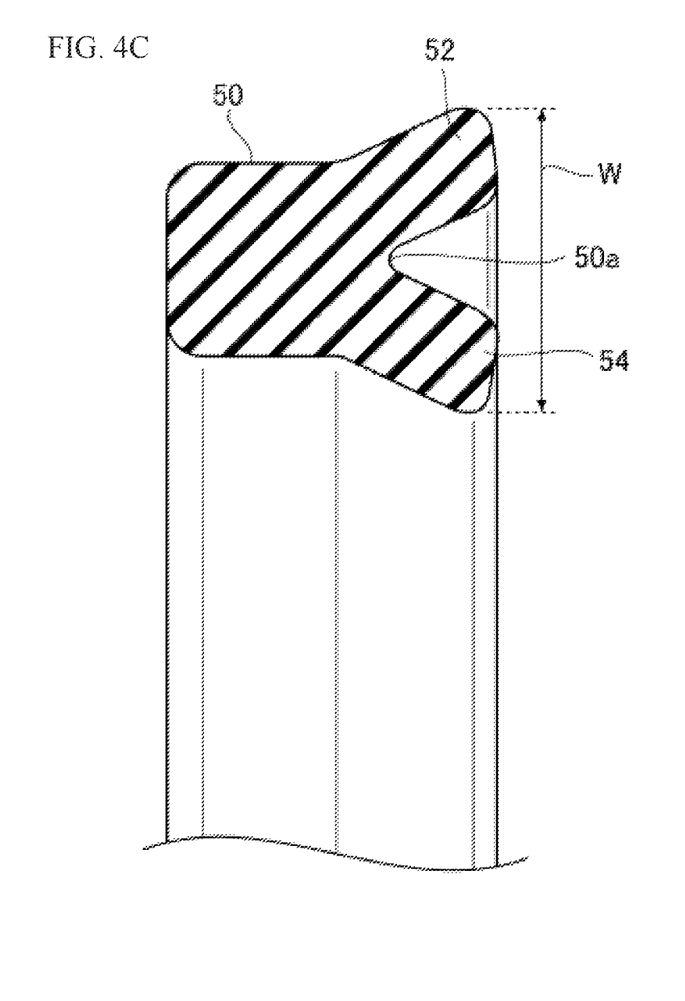
FIG. 4C is a partially enlarged view of the seal ring shown in FIG. 4B.

FIG. 4A is a front view of the seal ring 20, FIG. 4B is a cross-sectional view of the seal ring 20 taken along a line B-B shown in FIG. 4A, and FIG. 4C is a partially enlarged view of the seal ring 20 shown in FIG. 4B. The seal ring 20 includes a body portion 50, a first lip portion 52, and a second lip portion 54. A cross section of the seal ring 20 is formed in a Y shape.

The body portion 50, the first lip portion 52, and the second lip portion 54 are all formed in an annular shape. The first lip portion 52 protrudes in a direction away from an axial end portion 50a of the body portion 50 and outward in the radial direction, and protrudes obliquely outward from the axial end portion 50a of the body portion 50. The second lip portion 54 protrudes inward in the radial direction from the axial end portion 50a of the body portion 50, and protrudes obliquely inward from the body portion 50. The first lip portion 52 and the second lip portion 54 are formed so as to approach the axial end portion 50a of the body portion 50 in the axial direction, and are formed in a bifurcated shape. The first lip portion 52 and the second lip portion 54 are thinner than the body portion 50 and are easily bent. Since the first lip portion 52 protrudes outward in the radial direction, the first lip portion 52 can abut on the inner peripheral surface of the cylinder 12.

A width W of a line portion of the seal ring 20 is a width W in the radial direction including the first lip portion 52 and the second lip portion 54, and can be derived by halving a difference between the outermost diameter and the innermost diameter of the seal ring 20.

Figure 5:
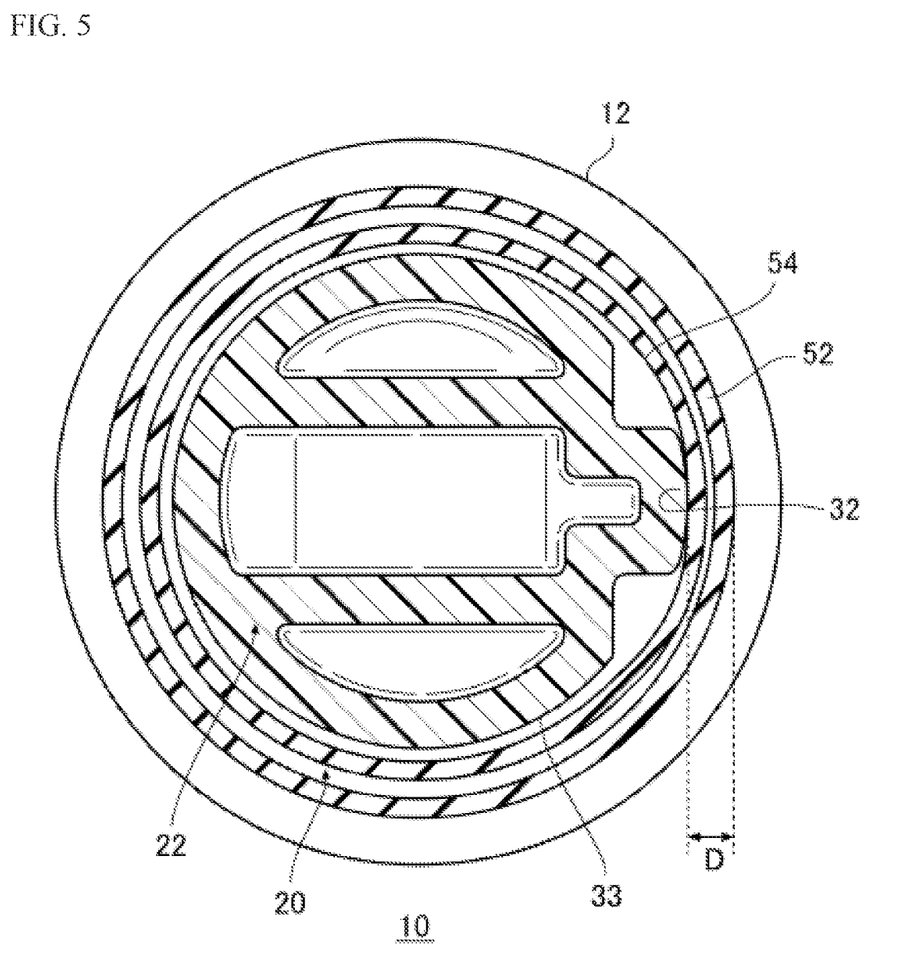
FIG. 5 is a cross-sectional view of the damper device at a position passing through the piston.

FIG. 5 is a cross-sectional view of the damper device 10 at a position passing through the piston 22. The protruding portion 32 abuts on the seal ring 20 and presses the seal ring 20 against the inner peripheral surface of the cylinder 12. Since a distance D between the protruding portion 32 and the inner peripheral surface of the cylinder 12 is smaller than the width W of the seal ring 20, the seal ring 20 is pressed against the inner peripheral surface of the cylinder 12 so as to be crushed.

The outermost diameter of the seal ring 20, that is, an outer diameter of the first lip portion 52 is larger than an inner diameter of the cylinder 12. Accordingly, a state where the first lip portion 52 is in contact with the inner peripheral surface of the cylinder 12 is maintained. The innermost diameter of the seal ring 20, that is, an inner diameter of the second lip portion 54 is larger than an outer diameter of the arc portion 33. That is, the second lip portion 54 may or may not abut on the arc portion 33 of the column portion 24. An abutting portion of the seal ring 20 on which the protruding portion 32 abuts may be partially enlarged in diameter by the abutting.

Figure 6A:
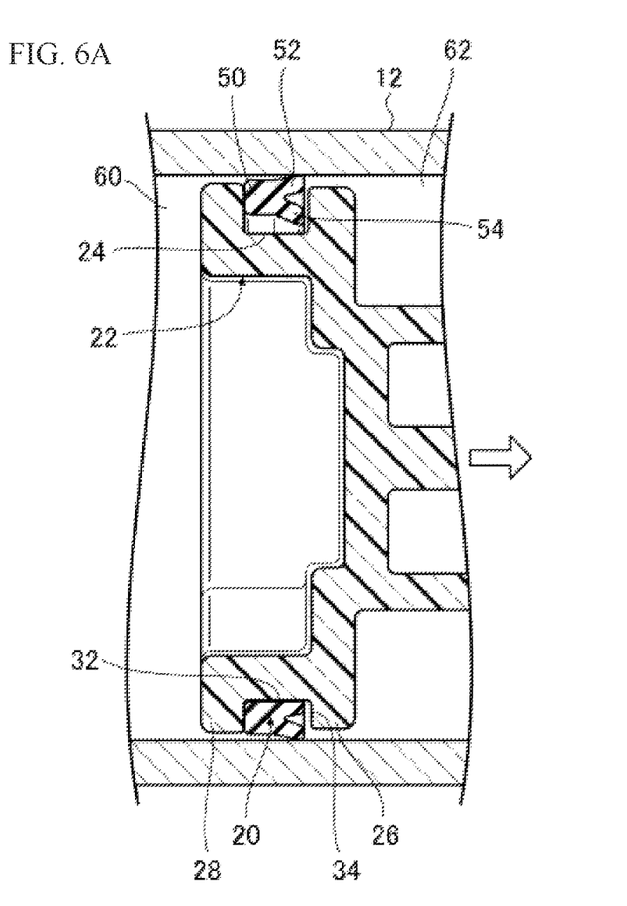
FIG. 6A and FIG. 6B are views for showing an operation of the seal ring, and are cross-sectional views of a piston portion of the damper device.
Figure 6B:
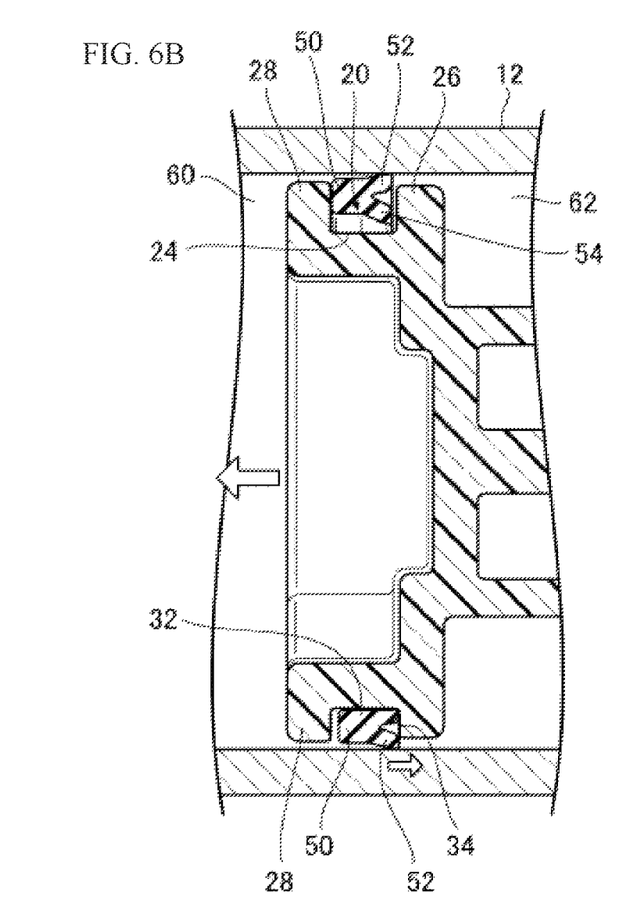

FIG. 6A and FIG. 6B are views for showing an operation of the seal ring 20, and are cross-sectional views of the piston 22 portion of the damper device 10. FIG. 6A shows a state where the seal ring 20 is not deformed, and FIG. 6B shows a state where the seal ring 20 is deformed and enters the cutout portion 34.

The seal ring 20 abuts on the cylinder 12 and the piston 22 and divides the inside of the cylinder 12 into a first chamber 60 on the bottom portion 40 side and a second chamber 62 on the opening portion 42 side. The body portion 50 abuts on the second restricting portion 28 in the axial direction and serves as a seal on the piston 22 side. Further, the first lip portion 52 abuts on the inner peripheral surface of the cylinder 12 in the radial direction and serves as a seal on the cylinder 12 side. Accordingly, the seal ring 20 closes the cylinder 12 and the piston 22 without a gap.

In the seal ring 20 shown in FIG. 6A, a portion that abuts on the protruding portion 32 is pressed against the inner peripheral surface of the cylinder 12, but a portion that does not abut on the protruding portion 32 is not pressed against the inner peripheral surface of the cylinder 12. The body portion 50 and the second lip portion 54 on an inner peripheral side of the seal ring 20 abut on the protruding portion 32. Accordingly, the first lip portion 52 is stably pressed against the cylinder 12.

In the piston 22 shown in FIG. 6A, the transmission portion 14 is pulled by an opening operation of the opening and closing body and moves toward the opening portion 42 side of the cylinder 12, and the seal ring 20 is maintained in a normal state where the seal ring 20 abuts on the second restricting portion 28 by the movement of the piston 22. When the piston 22 moves toward the opening portion 42 side, the first chamber 60 becomes a negative pressure due to an increase in volume, and generates a resistance force. Accordingly, the opening and closing body is slowly opened. Further, the negative pressure in the first chamber 60 is eliminated by the orifice formed in the cap 18.

Here, when the opening and closing body is rapidly opened, the first chamber 60 becomes too negative pressure, a force of pulling back the piston 22 becomes large, and the opened opening and closing body is returned in a closing direction. When a force in a backward direction is applied to the piston 22 and the seal ring 20 by the negative pressure in the first chamber 60 and the piston 22 and the seal ring 20 move backward, as shown in FIG. 6B, the seal ring 20 is in the deformed state where the seal ring 20 is deformed so as to enter the cutout portion 34. The abutting portion of the seal ring 20 abutting on the protruding portion 32 is pressed against the inner peripheral surface of the cylinder 12 by the protruding portion 32 more strongly than a portion other than the abutting portion, and the abutting portion is easily displaced from the piston 22 and is deformed so as to enter the cutout portion 34.

Figure 7:
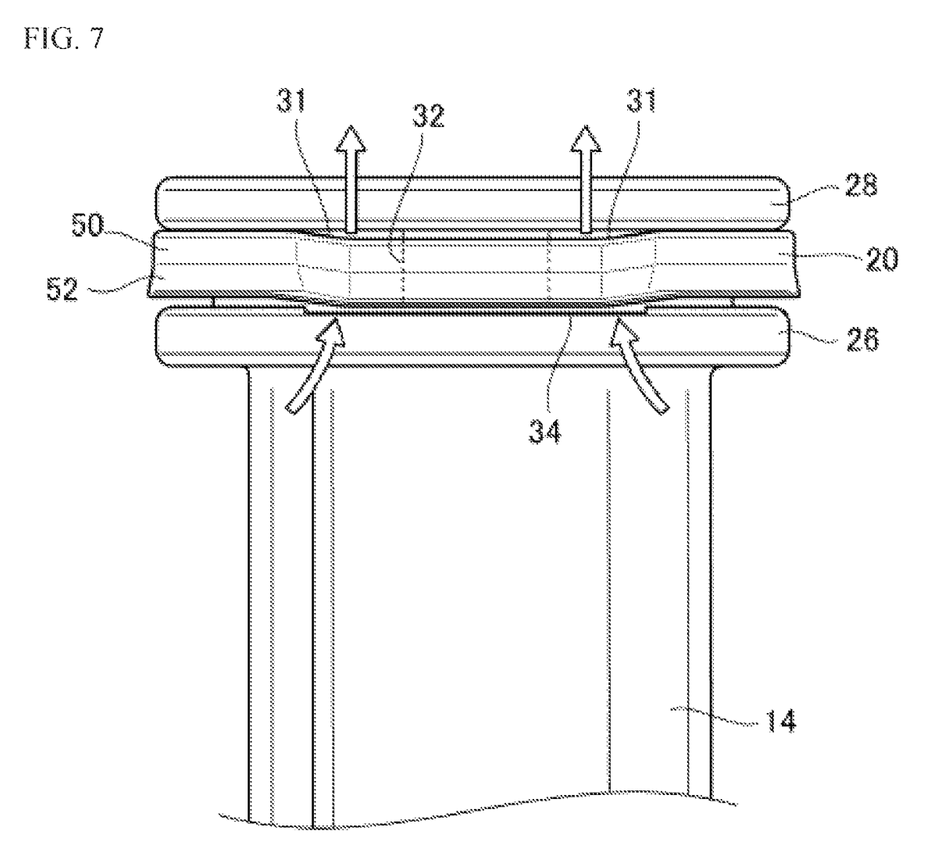
FIG. 7 is a side view of the seal ring and the piston and shows a state where the seal ring enters a cutout portion of the piston.

FIG. 7 is a side view of the seal ring 20 and the piston 22 and shows a state where the seal ring 20 enters a cutout portion 34 of the piston 22. That is, the seal ring 20 shown in FIG. 7 is in the same state as the state where the seal ring 20 shown in FIG. 6B is partially deformed, and can be in a deformed state where the seal ring 20 is deformed so as to partially enter the cutout portion 34 by the movement of the piston 22.

When the seal ring 20 is deformed so as to enter the cutout portion 34, the body portion 50 is separated from the second restricting portion 28, and the seal between the body portion 50 and the piston 22 is released. Accordingly, air on the second chamber 62 side passes through the inside of the seal ring 20 such as the recessed portion 31, and enters the first chamber 60 from the gap between the second restricting portion 28 and the seal ring 20. Therefore, the negative pressure in the first chamber 60 is eliminated, the pulling back of the piston 22 is stopped, and the movement of closing the rapidly opened opening and closing body is released. When the opening and closing body performs an opening operation after the negative pressure is eliminated, the state of being sealed with respect to the second restricting portion 28 returns only by restoring a part of the seal ring 20 that has entered the cutout portion 34, and therefore, the damping force can be exerted immediately after the negative pressure is eliminated.

In a case where the seal ring 20 is in the deformed state, and in a normal state where the seal ring 20 does not enter the cutout portion 34, the seal ring 20 is pressed against the inner peripheral surface of the cylinder 12 by the protruding portion 32. That is, the seal ring 20 is pressed against the cylinder 12 by the protruding portion 32 both in the normal state and in the deformed state. Accordingly, when the seal ring 20 is changed from the normal state to the deformed state, the pressing by the protruding portion 32 is maintained, and the seal ring 20 can be smoothly deformed.

Since the body portion 50 abuts on the second restricting portion 28 in the axial direction and serves as a seal on the piston 22 side, the seal ring 20 may be slightly separated from the second restricting portion 28 in order to release the seal on the piston 22 side. Since the seal can be released even if a deformation amount of the seal ring 20 is small, the seal release can be easily set. Further, since the deformation amount of the seal ring 20 may be small, it is possible to quickly release the movement of pulling back the piston 22 by the negative pressure.

An inner diameter R2 of the body portion 50 is larger than an outer diameter of the outer peripheral surface 30 of the column portion 24. The inner diameter R2 of the body portion 50 is larger than an outer diameter R1 of the arc portion 33 of the column portion 24 and larger than an outer diameter of the column portion 24 including the protruding portion 32. Accordingly, compared to a case where the seal ring is in close contact with the outer peripheral surface 30 of the column portion 24 and the inner peripheral surface of the cylinder 12, sliding between the seal ring 20 and the inner peripheral surface of the cylinder 12 is facilitated, and the movement of the piston 22 can be made smooth.

In a case where the seal ring 20 is in the deformed state, and in the normal state where the seal ring 20 does not enter the cutout portion 34, the seal ring 20 is pressed against the inner peripheral surface of the cylinder 12 by the protruding portion 32. Accordingly, the seal ring 20 is pressed against the cylinder 12 by the protruding portion 32 both in the normal state and in the deformed state, and the pressed portion is easily displaced from the piston 22 to be in the deformed state.

The seal ring 20 is partially pressed against the cylinder 12 by the protruding portion 32 and is partially deformed. Accordingly, frictional resistance between the seal ring 20 and the cylinder 12 can be suppressed. Further, since the seal ring 20 is partially deformed, the seal ring 20 can quickly return to the normal state by a restoring force of the seal ring 20. Accordingly, it is possible to shorten an idle running distance of the piston 22 until the seal ring 20 is restored.

As described above, according to the present invention, it is possible to provide a damper device in which, when a piston rapidly moves, it is difficult for the piston to return in a direction opposite to a direction in which the piston moves due to a pressure in a cylinder chamber.

The present invention is not limited to the embodiment described above and modifications such as various design changes can be added to the embodiment based on knowledge of a person skilled in the art. Embodiments to which such modifications are added can also be included in the scope of the present invention.

For example, in the embodiment, the orifice is formed in the cap 18, but the present invention is not limited this aspect, and the orifice may be formed in the piston 22. Further, in the embodiment, cross sections of the cylinder 12 and the piston 22 are formed in a perfect circular shape, but the present invention is not limited to this aspect, and the cross sections may be formed in an elongated hole shape or an elliptical shape.

Further, in the embodiment, an aspect in which the first restricting portion 26 is positioned on the opening portion 42 side and the second restricting portion 28 is positioned on the bottom portion 40 side is shown, but the present invention is not limited to this aspect, the first restricting portion 26 may be positioned on the bottom portion 40 side, and the second restricting portion 28 may be positioned on the opening portion 42 side. Accordingly, a timing at which the seal ring 20 releases the seal is opposite to the movement of the piston 22. That is, the first chamber 60 becomes excessively positive pressure due to the rapid pushing of the piston 22, and when the piston 22 is returned, the seal ring 20 enters the cutout portion 34 to release the seal.

What is claimed is:

1. A damper device comprising:
    a cylinder having a bottom portion and an opening portion;
    a piston capable of moving forward and backward in the cylinder in an axial direction; and
    a seal ring provided on an outer periphery of the piston and configured to abut on an inner periphery of the cylinder, wherein
    the piston includes:
        a column portion wound around the seal ring; and
        a first restricting portion and a second restricting portion that are positioned on both end sides of the column portion in the axial direction, that are formed so as to protrude outward in a radial direction from an outer peripheral surface of the column portion, and that are configured to restrict movement of the seal ring in the axial direction,
    the column portion has a protruding portion protruding outward in the radial direction on the outer peripheral surface,
    the first restricting portion has a cutout portion that is formed so as to cut out a surface facing the second restricting portion and that is positioned to be continuous with the protruding portion in the axial direction,
    the seal ring is provided so as to be sealable with respect to the second restricting portion, and is capable of taking a deformed state where the seal ring is deformed so as to partially enter the cutout portion by movement of the piston,
    in a case where the seal ring is in the deformed state, and in a normal state where the seal ring does not enter the cutout portion, the seal ring is pressed against an inner peripheral surface of the cylinder by the protruding portion, and
    the protruding portion is configured to reach the cutout portion and is connected to the first restricting portion.

2. The damper device according to claim 1, wherein
    the seal ring includes:
        a body portion formed in an annular shape; and
        a lip portion formed in an annular shape and protruding outward in the radial direction from an axial end portion of the body portion,
    the body portion is configured to abut on the second restricting portion in the axial direction to serve as a seal on a side of the piston, and
    the lip portion is configured to abut on the inner peripheral surface of the cylinder to serve as a seal on a side of the cylinder.

3. The damper device according to claim 2, wherein
    the protruding portion is configured to abut on the body portion.

4. The damper device according to claim 2, wherein
    an inner diameter of the body portion is larger than an outer diameter of the outer peripheral surface of the column portion.

5. The damper device according to claim 1, wherein
    the damper device is configured to be connected to a fixed body and an opening and closing body,
    the damper device further comprises a transmission portion connected to the piston and capable of transmitting an external force to the piston,
    the cylinder has a first shaft support portion attached to one of the fixed body and the opening and closing body,
    the transmission portion has a second shaft support portion that is attached to the other of the fixed body and the opening and closing body and that is parallel to the first shaft support portion, and
    the protruding portion protrudes along an axial direction of the first shaft support portion and the second shaft support portion.

6. The damper device according to claim 1, wherein
    the column portion has an arc portion formed on the outer peripheral surface and the protruding portion protruding outward in the radial direction from a circumscribed circle of the arc portion.

* * * * *